(12) United States Patent
Lin et al.

(10) Patent No.: US 8,536,881 B2
(45) Date of Patent: Sep. 17, 2013

(54) TOUCH SENSING SYSTEM, CAPACITANCE SENSING CIRCUIT AND CAPACITANCE SENSING METHOD THEREOF

(75) Inventors: Ching-Chun Lin, Taipei County (TW); Wing-Kai Tang, Hsinchu (TW); Ching-Ho Hung, Hsinchu (TW); Tsen-Wei Chang, Taichung County (TW); Yi-Liang Lin, Hsinchu County (TW); Jiun-Jie Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 351 days.

(21) Appl. No.: 12/895,871

(22) Filed: Oct. 1, 2010

(65) Prior Publication Data
US 2011/0193571 A1    Aug. 11, 2011

(30) Foreign Application Priority Data
Feb. 8, 2010   (TW) ................................ 99103790 A

(51) Int. Cl.
*G01R 27/26*   (2006.01)
(52) U.S. Cl.
USPC ............................. 324/679; 324/676; 324/686
(58) Field of Classification Search
USPC ......................................... 324/457, 658–690
See application file for complete search history.

(56) References Cited

U.S. PATENT DOCUMENTS

| | | | | |
|---|---|---|---|---|
| 5,594,353 A | * | 1/1997 | Hemphill | 324/681 |
| 5,770,802 A | * | 6/1998 | Berthold et al. | 73/765 |
| 7,477,180 B2 | * | 1/2009 | Lin et al. | 341/172 |
| 8,086,417 B2 | * | 12/2011 | Seguine | 702/105 |
| 2008/0122457 A1 | * | 5/2008 | Taguchi | 324/679 |

FOREIGN PATENT DOCUMENTS

| | | |
|---|---|---|
| CN | 1979404 | 6/2007 |
| CN | 101493742 | 7/2009 |

OTHER PUBLICATIONS

"First Office Action of China Counterpart Application", issued on Sep. 5, 2012, p. 1-p. 5.

* cited by examiner

*Primary Examiner* — Huy Q Phan
*Assistant Examiner* — Dustin Dickinson
(74) *Attorney, Agent, or Firm* — Jianq Chyun IP Office

(57) ABSTRACT

A touch sensing system which includes a touch input interface and a capacitance sensing circuit is provided. The touch input interface includes a plurality of sensing capacitors which output at least one waveform under test and at least one reference waveform. The capacitance sensing circuit includes a difference comparing unit. The difference comparing unit receives the waveform under test and the reference waveform and outputs a differential signal according to at least one positive edge difference and at least one negative edge difference between the waveform under test and the reference waveform. Furthermore, a capacitance sensing method is also provided.

30 Claims, 11 Drawing Sheets

TOUCH SENSING SYSTEM, CAPACITANCE SENSING CIRCUIT AND CAPACITANCE SENSING METHOD THEREOF

CROSS-REFERENCE TO RELATED APPLICATION

This application claims the priority benefit of Taiwan application serial no. 99103790, filed on Feb. 8, 2010. The entirety of the above-mentioned patent application is hereby incorporated by reference herein and made a part of specification.

BACKGROUND OF THE INVENTION

1. Field of the Invention

The invention relates to a sensing circuit and a sensing method thereof, and more particularly, to a capacitance sensing circuit and a capacitance sensing method thereof.

2. Description of Related Art

In this information era, reliance on electronic products is increasing day by day. The electronic products including notebook computers, mobile phones, personal digital assistants (PDAs), digital walkmans, and so on are indispensable in our daily lives. Each of the aforesaid electronic products has an input interface for a user to input his or her command, such that an internal system of each of the electronic product spontaneously runs the command. At this current stage, the most common input interface includes a keyboard and a mouse.

From the user's aspect, it is sometimes rather inconvenient to use the conventional input interface including the keyboard and the mouse. Manufacturers aiming to resolve said issue thus start to equip the electronic products with touch input interfaces, e.g. touch pads or touch panels, so as to replace the conditional keyboards and mice. At present, the users' commands are frequently given to the electronic products by physical contact or sensing relationship between users' fingers or styluses and the touch input interfaces. For instance, a capacitive touch input interface characterized by a multi-touch function is more user-friendly than the conventional input interface and thus gradually becomes more and more popular.

However, given that a one-end sensing circuit is applied to the capacitive touch input interface, voltage of a capacitor under test is required to be measured and stored as a base line voltage before touch sensing with the capacitor under test, as shown in FIG. 1.

FIG. 1 shows the schematic waveforms of voltage of the capacitor under test before and after touch sensing. Before touch sensing, the one-end sensing circuit requires storing voltage V of the capacitor under test as a base line voltage. Next, a voltage variation ΔV of the capacitor under test can be obtained by subtracting the voltage V' which is actually sensed by the capacitor under test from the base line voltage. Herein, the one-end sensing circuit stores the voltage variation ΔV in an internal capacitor therein by single edge couple. For instance, in FIG. 1, the one-end sensing circuit stores the voltage variation ΔV of positive edge couple of the waveforms in the internal capacitor therein.

Furthermore, the reference capacitance of the capacitor under test of the one-end sensing circuit is a fixed value, and therefore the external noise can not be canceled indeed, such that signal-to-noise ratio (SNR) of the one-end sensing circuit can not be enhanced effectively.

SUMMARY OF THE INVENTION

An embodiment of the invention provides a capacitance sensing circuit capable of effectively enhancing SNR thereof and achieving the purpose of power-saving by dual edge couple.

An embodiment of the invention provides a touch sensing system capable of effectively enhancing SNR of the capacitance sensing circuit thereof and achieving the purpose of power-saving by dual edge couple.

An embodiment of the invention provides a capacitance sensing method capable of effectively enhancing SNR of the capacitance sensing circuit using the same and achieving the purpose of power-saving by dual edge couple.

An embodiment of the invention provides a capacitance sensing circuit which includes a difference comparing unit. The difference comparing unit receives a waveform under test and a reference waveform and outputs a differential signal according to at least one positive edge difference and at least one negative edge difference between the waveform under test and the reference waveform.

An embodiment of the invention provides a touch sensing system which includes a touch input interface and the above capacitance sensing circuit. The touch input interface includes a plurality of sensing capacitors which output at least one waveform under test and at least one reference waveform.

In an embodiment of the invention, the difference comparing unit has a first input end and a second input end. In at least one first period of a sensing period, the first input end receives the waveform under test, and the second input end receives the reference waveform. In at least one second period of the sensing period, the first input end receives the reference waveform, and the second input end receives the waveform under test.

In an embodiment of the invention, the capacitance sensing circuit further includes a first sensing channel and a second sensing channel. The first sensing channel senses the waveform under test or the reference waveform. The second sensing channel senses the waveform under test or the reference waveform. In the first period of the sensing period, the first sensing channel senses the waveform under test and transmits the waveform under test to the first input end of the difference comparing unit, and the second sensing channel senses the reference waveform and transmits the reference waveform to the second input end of the difference comparing unit. In the second period of the sensing period, the first sensing channel senses the reference waveform and transmits the reference waveform to the first input end of the difference comparing unit, and the second sensing channel senses the waveform under test and transmits the waveform under test to the second input end of the difference comparing unit.

In an embodiment of the invention, the capacitance sensing circuit further includes a swap unit. The swap unit switches the first sensing channel to sense the waveform under test or the reference waveform and switches the second sensing channel to sense the waveform under test or the reference waveform.

In an embodiment of the invention, the swap unit includes a first switch unit. In the first period, the first switch unit switches the first sensing channel to receive the waveform under test and switches the second sensing channel to receive the reference waveform, and in the second period, the first switch unit switches the first sensing channel to receive the reference waveform and switches the second sensing channel to receive the waveform under test.

In an embodiment of the invention, the swap unit further includes a second switch unit. In the sensing period, the second switch unit transmits an output of the first sensing channel to the first input end and transmits an output of the second sensing channel to the second input end.

In an embodiment of the invention, the capacitance sensing circuit further includes a first sensing channel and a second sensing channel. The first sensing channel senses the waveform under test or the reference waveform. The second sensing channel senses the waveform under test or the reference waveform. In the first period of the sensing period, the first sensing channel senses the waveform under test and transmits the waveform under test to the first input end of the difference comparing unit, and the second sensing channel senses the reference waveform and transmits the reference waveform to the second input end of the difference comparing unit. In the second period of the sensing period, the first sensing channel senses the waveform under test and transmits the waveform under test to the second input end of the difference comparing unit, and the second sensing channel senses the reference waveform and transmits the reference waveform to the first input end of the difference comparing unit.

In an embodiment of the invention, the capacitance sensing circuit further includes a swap unit. The swap unit switches the first sensing channel to transmit the waveform under test to the first input end or the second input end and switches the second sensing channel to transmit the reference waveform to the first input end or the second input end.

In an embodiment of the invention, the swap unit includes a first switch unit. In the first period, the first switch unit switches the first sensing channel to transmit the waveform under test to the first input end and switches the second sensing channel to transmit the reference waveform to the second input end, and in the second period, the first switch unit switches the first sensing channel to transmit the waveform under test to the second input end and switches the second sensing channel to transmit the reference waveform to the first input end.

In an embodiment of the invention, the swap unit further includes a second switch unit. In the sensing period, the second switch unit switches the first sensing channel to receive the waveform under test and switches the second sensing channel to receive the reference waveform.

In an embodiment of the invention, the first periods and the second periods of the sensing period are alternately arranged.

In an embodiment of the invention, an output of the first sensing channel and an output of the second sensing channel form the positive edge differences in each of the first periods and form the negative edge differences in each of the second periods. The difference comparing unit amplifies and integrates the positive edge differences and the negative edge differences to output the differential signal.

In an embodiment of the invention, the difference comparing unit includes a differential amplifier, a comparator, or an integrator.

In an embodiment of the invention, a touch display including the above touch sensing system is provided.

In an embodiment of the invention, a portable electronic apparatus including the above touch sensing system is provided.

An embodiment of the invention provides a capacitance sensing method which includes the following steps. A waveform under test and a reference waveform are received. A differential signal is outputted according to at least one positive edge difference and at least one negative edge difference between the waveform under test and the reference waveform.

In an embodiment of the invention, the capacitance sensing method further includes the following steps. In at least one first period of a sensing period, the positive edge difference is calculated according to the waveform under test and the reference waveform. In at least one second period of the sensing period, the negative edge difference is calculated according to the waveform under test and the reference waveform.

In an embodiment of the invention, the first periods and the second periods of the sensing period are alternately arranged.

In an embodiment of the invention, the step of outputting the differential signal further includes the following steps. In each of the first periods, the positive edge difference is sensed. In each of the second periods, the negative edge difference is sensed. The positive edge differences and the negative edge differences are amplified and integrated to output the differential signal.

Based on the above, in the embodiments of the invention, by using the reference signal as a reference value for measuring the signal under test, the capacitance sensing circuit can cancel the external noise and further enhance the SNR thereof. Furthermore, in the sensing period, the capacitance sensing circuit senses the waveform under test and the reference waveform and outputs the differential signal according to the positive edge difference and the negative edge difference between the waveform under test and the reference waveform, so as to reduce the number of driving pulses of the capacitance sensing circuit and further achieve the purpose of power-saving.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a capacitive touch input interface, capacitance of a sensing capacitor is determined on whether a position of the sensing capacitor correspondingly on the touch input interface is touched. When the position of the sensing capacitor correspondingly on the touch input interface is touched, capacitance variation is induced by the touch object accordingly, such that a capacitance under test is generated by the touch object and the sensing capacitor.

According to the embodiments of the invention, except for the aforesaid capacitance under test, other capacitances of sensing capacitors can serve as reference values for measuring the capacitance under test. Hence, after the capacitance under test and the reference capacitance are compared, the touch position of the touch object correspondingly on the touch input interface can be determined.

In the embodiments provided hereinafter, a touch panel exemplarily acts as the touch input interface, while people having ordinary skill in the art are aware that the touch panel does not pose a limitation on the touch input interface of the invention. Meanwhile, the invention is not limited to the touch input interface. Any input interface capable of sensing capacitance variations does not depart from the protection scope of the invention.

Figure 1:
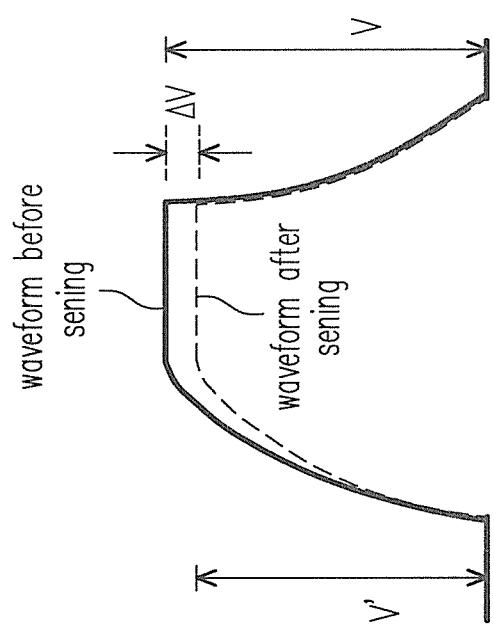
FIG. 1 shows the schematic waveforms of voltage of the capacitor under test before and after touch sensing.
Figure 2:
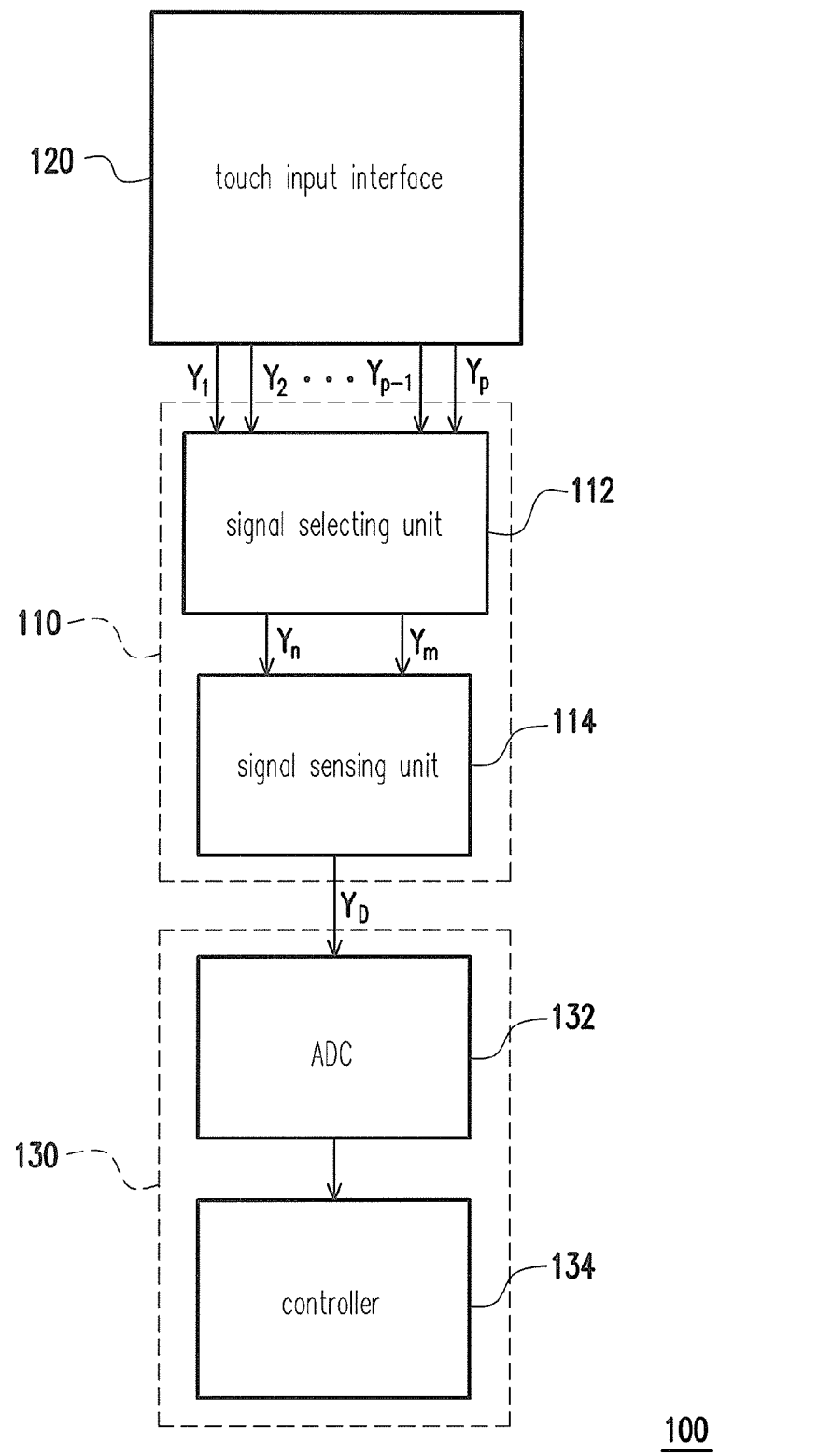
FIG. 2 is a block circuit diagram illustrating a touch sensing system according to an embodiment of the invention.

FIG. 2 is a block circuit diagram illustrating a touch sensing system according to an embodiment of the invention. As indicated in FIG. 2, a touch sensing system 100 of this embodiment includes a capacitance sensing apparatus 110, a touch input interface 120, and a control unit 130, wherein the touch input interface 120, for instance, is a touch panel of a display or other touch pads having the function of touch sensing. The touch input interface 120 includes a plurality of sensing capacitors for outputting a plurality of sensing signals $Y_1$-$Y_p$.

Figure 3:
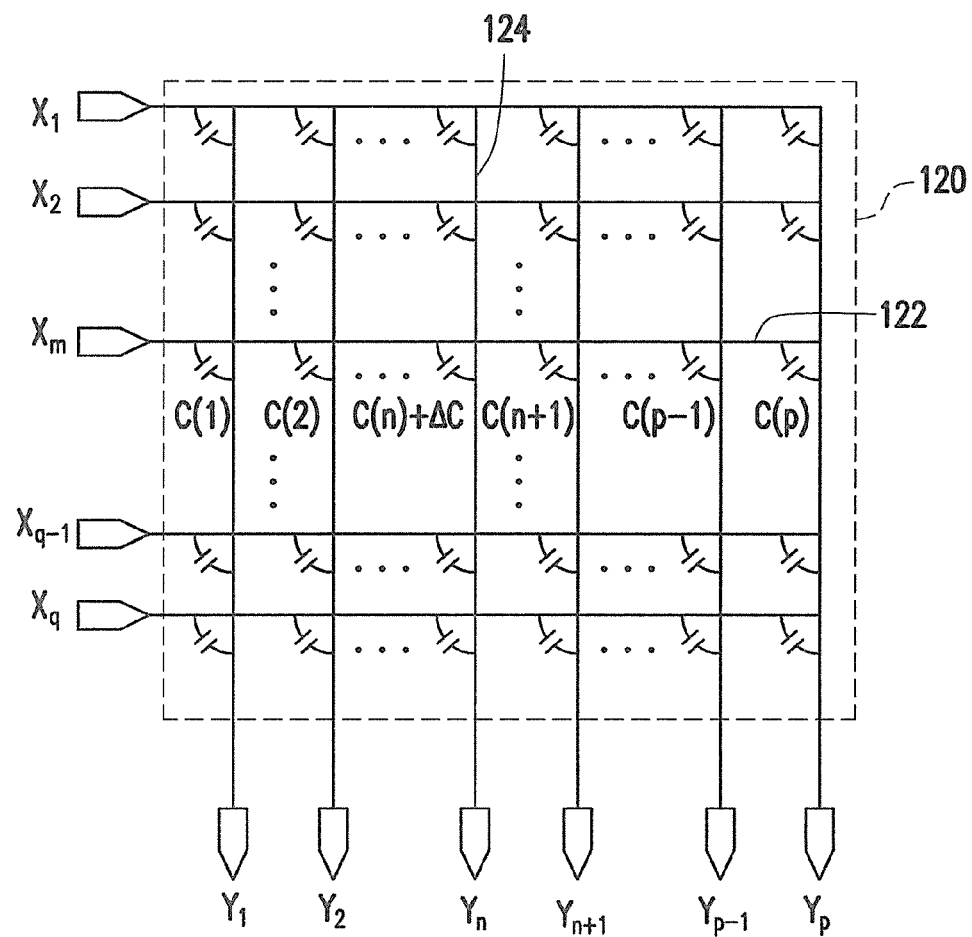
FIG. 3 is a schematic circuit diagram illustrating a touch input interface of FIG. 2.

FIG. 3 is a schematic circuit diagram illustrating a touch input interface 120 of FIG. 2. Referring to FIG. 2 and FIG. 3, in the present embodiment, capacitance of the sensing capacitor is determined on whether a position of the sensing capacitor correspondingly on the touch input interface is touched. For instance, when the position of the sensing capacitor $C(n)$ correspondingly on the touch input interface is touched, the touch object accordingly generates a capacitance variation $\Delta C$.

Accordingly, the sensing capacitor $C(n)$ and the capacitance variation $\Delta C$ form a capacitor under test $C(n)+\Delta C$ and further output a signal under test $Y_n$ through the sensing line 124.

Next, the capacitance of the capacitor under test $C(n)+\Delta C$ can be determined by the capacitance sensing apparatus 110, such that the capacitance variation $\Delta C$ can be obtained. Thereafter, the control unit 130 can determine the position of the capacitor under test $C(n)+\Delta C$ correspondingly on the touch input interface 120 according to the capacitance variation $\Delta C$. That is, the control unit 130 determines the touch position correspondingly on the touch input interface 120 according to the capacitance variation $\Delta C$.

It should be noted that, in the present embodiment, except for the aforesaid capacitance under test, other capacitances of sensing capacitors can serve as reference signals for measuring the capacitance under test to cancel the external noise indeed, thereby enhancing the SNR of the touch sensing system 100.

Specifically, for instance, when a mutual capacitance touch sensing system operates, the sensing capacitors of the touch input interface 120 correspondingly receive driving signals $X_1$-$X_q$ from a driving unit (not shown) through driving lines and further generate sensing signals $Y_1$-$Y_p$ on the corresponding sensing lines. Herein, p and q are positive integers, and 1<p, 1<q. For instance, while driving, the driving signal $X_m$ applied on the driving line 122 is coupled to the sensing line 124 which intersects therewith through the sensing capacitor $C(n)$. Herein, n and m are positive integers, and $1 \leq n \leq p$, $1 \leq m \leq q$.

Accordingly, during operation, by applying the driving signal $X_m$ on the driving line 122, the capacitance sensing apparatus 110 can obtains the capacitance distribution of the sensing capacitors $C(1)$-$C(p)$.

Hence, when the touch object, e.g. figures or touch pans, approaches or touches the position of the sensing capacitor $C(n)$ correspondingly on the touch input interface 120, the touch object accordingly generates the capacitance variation $\Delta C$ and further changes the capacitance distribution. Accordingly, the touch sensing system 100 can determine the position of the capacitor under test $C(n)+\Delta C$ correspondingly on the touch input interface 120 through the capacitance sensing apparatus 110 and the control unit 130.

In the present embodiment, the capacitance sensing apparatus 110 includes a signal selecting unit 112 and a signal sensing unit 114. The control unit 130 includes a analog-to-digital converter (ADC) 132 and a controller 134.

The signal selecting unit 112 receives the sensing signals $Y_1$-$Y_p$ and selects at least one signal under test and at least one reference signal from the sensing signals $Y_1$-$Y_p$. Next, the signal selecting unit 112 transmits the signal under test and the reference signal which are selected to the signal sensing unit 114 to perform a difference comparison.

For instance, during a sensing period, the signal selecting unit 112 selects the sensing signals $Y_n$ and $Y_m$ to the signal sensing unit 114 to perform the difference comparison. Herein, m is a positive integers, and $1 \leq m \leq p$, $m \neq n$. That is, while measuring the capacitor under test, the signal selecting unit 112 selects the sensing signal $Y_m$ as the reference signal and transmits it to the signal sensing unit 114 to perform the difference comparison with the sensing signal $Y_n$. Next, after finishing the difference comparison, the signal sensing unit 114 generates a differential signal $Y_D$ and outputs it to the control unit 130. The control unit 130 determines the touch position correspondingly on the touch input interface 120 according to the differential signal $Y_D$.

Accordingly, in the present embodiment, for measuring the capacitance under test, except for the signal under test $Y_n$, the signal selecting unit 112 selects the sensing signal $Y_m$ as the reference signal from the sensing signals which are not selected, such that the external noise of the touch input interface 120 can be canceled and further the SNR of the touch sensing system 100 is enhanced.

That is, the noise of the touch input interface 120 can be viewed as common mode noise. Accordingly, by selecting at least one sensing signal as the reference signal from the sensing signals which are not selected for measuring the capacitance under test, the common mode noise of the sensing circuit can be canceled to enhance the SNR of the touch sensing system.

In the present embodiment, the signal sensing unit 114, for example, is a comparator (not shown) which receives and compares the signal under test and the reference signal transmitted by the signal selecting unit 112 to generate the corresponding differential signal $Y_D$ to the control unit 130, but the invention is not limited thereto. In another embodiment, the signal sensing unit 114, for example, is a differential amplifier. When the signal sensing unit 114 is the differential amplifier, the voltage difference between the signal under test and the reference signal can be compared, amplified, and outputted to the control unit 130, so as to ensure accurate determination of the touch position. Besides, in still another embodiment, the signal sensing unit 114 can also be an integrator, for example. In this case, the voltage difference between the signal under test and the reference signal can be integrated and amplified by the integrator to output the corresponding differential signal $Y_D$ to the control unit 130.

In the present embodiment, the differential signal $Y_D$ generated by the signal sensing unit 114, for example, is an analog signal. Accordingly, after receiving the analog signal, the ADC 132 converts it to a digital signal. Next, the controller 134 performs a digital operation on the digital signal to obtain the touch position of the capacitor under test $C(n)+\Delta C$ correspondingly on the touch input interface 120. That is, the control unit 134 determines the touch position correspondingly on the touch input interface 120 according to the differential signal $Y_D$.

It should be noted that, in the present embodiment, the mutual capacitance touch sensing system is an exemplary example for the touch sensing system 100, and it does not limit the invention. In other embodiments, the touch sensing system 100 may be a self capacitance touch sensing system or other types of touch sensing systems.

Besides, in the present embodiment, for measuring the capacitance under test, the touch input interface 120 selects one of the sensing signals as the reference signal from the sensing signals which are not selected. In another embodiment, the touch input interface may also select any two of the sensing signals as the reference signals from the sensing signals which are not selected.

Figure 4:
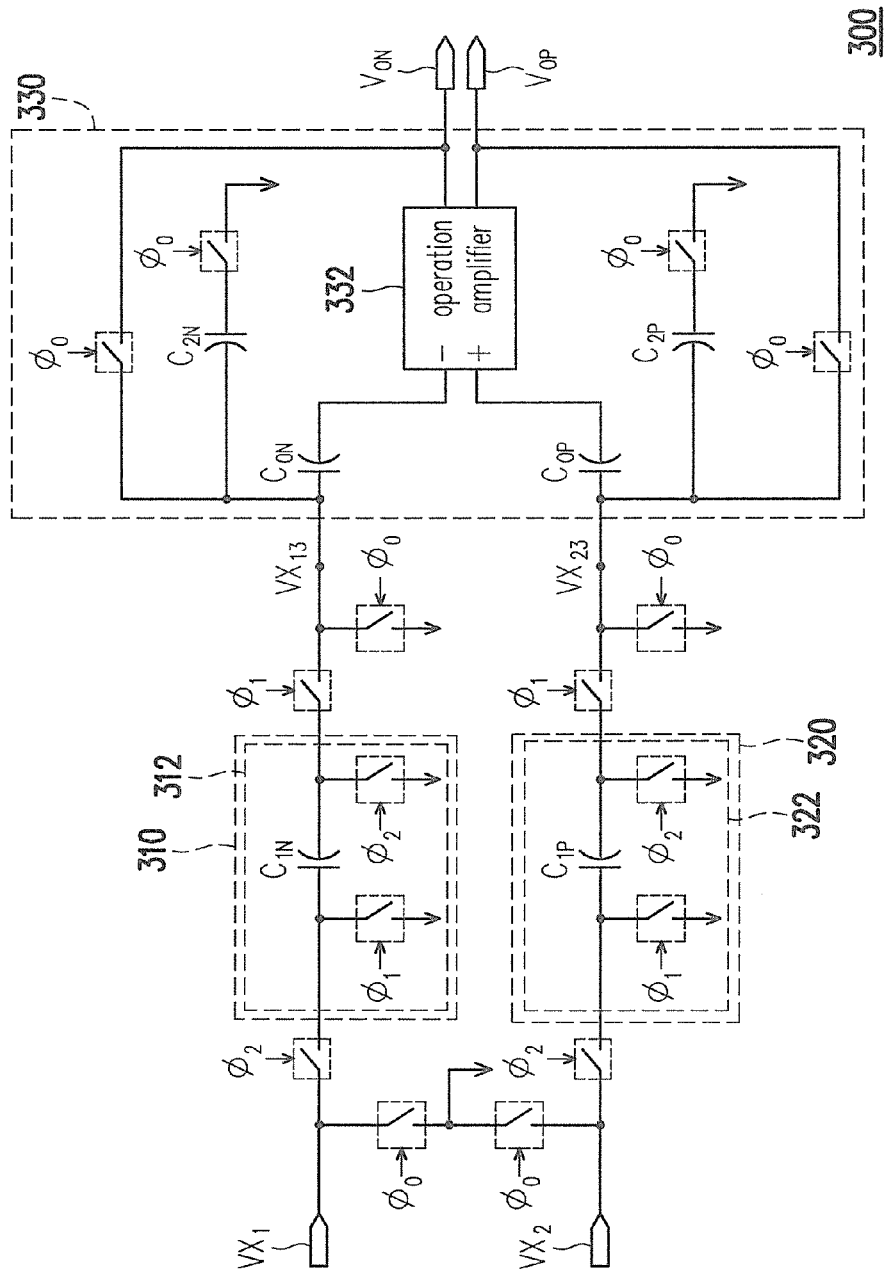
FIG. 4 is a schematic circuit diagram illustrating a capacitance sensing circuit according to an embodiment of the invention.

FIG. 4 is a schematic circuit diagram illustrating a capacitance sensing circuit according to an embodiment of the invention. Referring to FIG. 4, in the embodiments of the invention, the signal sensing unit 114, for example, includes the capacitance sensing circuit shown in FIG. 4 which senses the voltages or the capacitances corresponding to the signal under test and the reference signals.

In the present embodiment, the capacitance sensing circuit 300 includes a first sensing channel 310, a second sensing channel 320, and a difference comparing unit 330. The first sensing channel 310 senses the signal under test corresponding to the capacitor under test, e.g. the signal under test $Y_n$ shown in FIG. 2. The second sensing channel 320 senses the reference signal corresponding to the reference capacitor, e.g. the reference signal $Y_m$ shown in FIG. 2.

The difference comparing unit 330 has a first input end $VX_{13}$ and a second input end $VX_{23}$. The first input end $VX_{13}$ receives an output of the first sensing channel 310. The second input end $VX_{23}$ receives an output of the second sensing channel 320. Accordingly, the difference comparing unit 330 outputs the differential signal $Y_D$ according to the signal under test and the reference signal.

Figure 5:
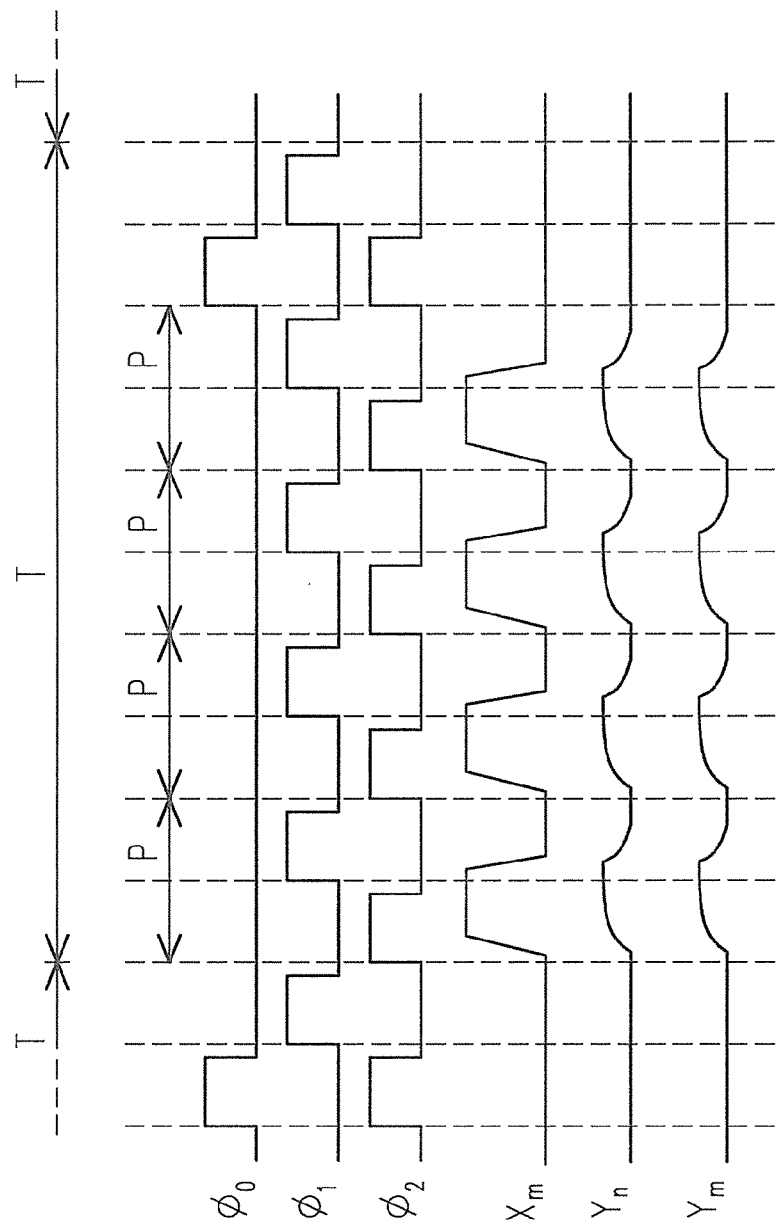
FIG. 5 is a timing diagram of control signals of the capacitance sensing circuit.

Specifically, FIG. 5 is a timing diagram of control signals of the capacitance sensing circuit. Referring to FIG. 2, FIG. 4, and FIG. 5, in the present embodiment, the first sensing channel 310 includes a first charge-to-voltage converting unit 312, the second sensing channel 320 includes a second charge-to-voltage converting unit 322, and the difference comparing unit 330 includes an operation amplifier 332. Herein, the difference comparing unit 330 is implemented with the circuit configuration of integrator, but the invention is not limited thereto.

Specifically, during each period P of the sensing period T, the driving signal $X_m$ is applied on the driving line 122 and coupled to the sensing line 124 which intersects therewith through the capacitor under test $C(n)+\Delta C$ to generate the signal under test $Y_n$. The first sensing channel 310 receives the signal under test $Y_n$ through the pad $VX_1$ to sense the signal under test $Y_n$ corresponding to the capacitor under test, which has a waveform as shown in FIG. 5.

During the first period P, when the timing signal $\psi 2$ is at a high level, the charge corresponding to the capacitor under test is stored in the storage capacitor $C_{1N}$. Next, when the timing signal $\psi 1$ is at the high level, the charge stored in the storage capacitor $C_{1N}$ is transmitted to the difference comparing unit 330 through the first input end $VX_{13}$ and stored in the integration capacitor $C_{2N}$. That is, through the storage capacitor $C_{1N}$, the first charge-to-voltage converting unit 312 can convert the charge which is received thereby to a voltage under test and transmit it to the difference comparing unit 330.

Meanwhile, the second sensing channel 320 receives the reference signal $Y_m$ through the pad $VX_2$ to sense the reference signal $Y_m$ corresponding to the reference capacitor, which has a waveform as shown in FIG. 5. Next, the second charge-to-voltage converting unit 322 converts the charge which is received thereby to a reference voltage and transmit it to the difference comparing unit 330.

Accordingly, through the operation amplifier 332 and the integration capacitors $C_{2N}$ and $C_{2P}$, the difference comparing unit 330 can integrate and amplify the voltage difference between the signal under test and the reference signal, and the gains are $C_{1N}/C_{2N}$ and $C_{1P}/C_{2P}$, respectively. Herein, it can be supposed with $C_{1N}=C_{1P}$, and $C_{2N}=C_{2P}$, but the invention is not limited thereto.

Figure 6:
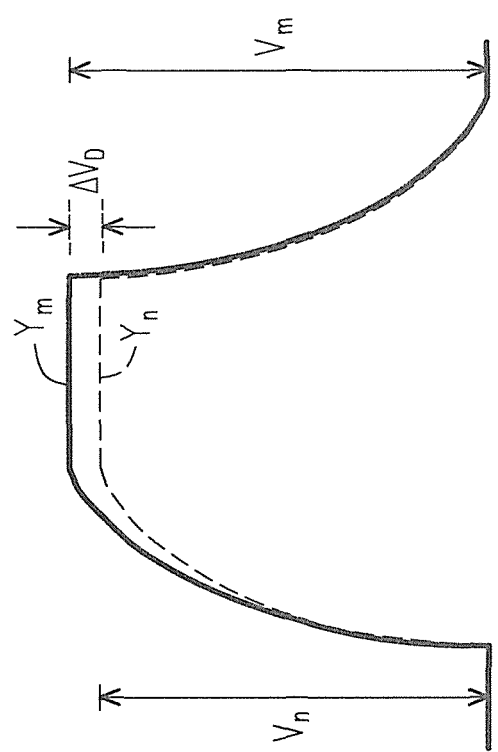
FIG. 6 shows schematic waveforms of the signal under test and the reference signal in FIG. 5.

FIG. 6 shows schematic waveforms of the signal under test $Y_n$ and the reference signal $Y_m$ in FIG. 5. Referring FIG. 5 and FIG. 6, in the present embodiment, the voltage under test $V_n$ corresponds to the signal under test $Y_n$, and the reference voltage $V_m$ corresponds to the reference signal $Y_m$.

It should be noted that, the waveform of the signal under test $Y_n$, for example, represents the waveform of the signal generated by the capacitor under test when the position of the capacitor under test correspondingly on the touch input interface is touched. The waveform of the reference signal $Y_m$, for example, represents the waveform of the signal generated by the reference capacitor, which serves as the reference waveform for measuring the capacitance under test. Accordingly, during each period P, the difference comparing unit 330 integrates and amplifies the voltage difference $\Delta V_D$ between the signal under test $Y_n$ and the reference signal $Y_m$.

In the present embodiment, the sensing period T, for example, includes four periods P. When the timing signal $\psi_0$ is at the high level, the voltage difference $\Delta V_D$ which has been integrated and amplified during each period P can be stored in capacitors $C_{ON}$ and $C_{OP}$, and the corresponding differential signal $Y_D$ is outputted through the pads $V_{ON}$ and $V_{OP}$. Accordingly, the difference comparing unit 330 outputs the differential signal $Y_D$ corresponding to the voltage difference $\Delta V_D$ according to the voltage under test $V_n$ and the reference voltage $V_m$. That is, the difference comparing unit 330 outputs the differential signal $Y_D$ according to the signal under test and the reference signal.

In the present embodiment, the sensing period T includes four periods P, but the invention is not limited thereto. In another embodiment, the sensing period T, for example, simply includes one period P.

It should be noted that, in the present embodiment, the two sensing channels which respectively sense the waveform under test and the reference waveform are exemplary. In other embodiments, the capacitance sensing circuit 300 may include three or more than three sensing channels. One of them senses the waveform under test, and the others sense the reference waveforms. That is, the signal selecting unit 112 selects two of the sensing signals as the reference signals from the sensing signals which are not selected for measuring the capacitance under test.

Besides, in the present embodiment, the difference comparing unit 330 is implemented with the circuit configuration of integrator, but the invention is not limited thereto. In another embodiment, the signal sensing unit 330, for example, is a differential amplifier or a comparator.

Accordingly, in the present embodiment, except for the capacitance under test, other capacitances of sensing capacitors can serve as reference signals for measuring the capacitance under test to cancel the external noise indeed, thereby enhancing the SNR of the touch sensing system.

Figure 7:
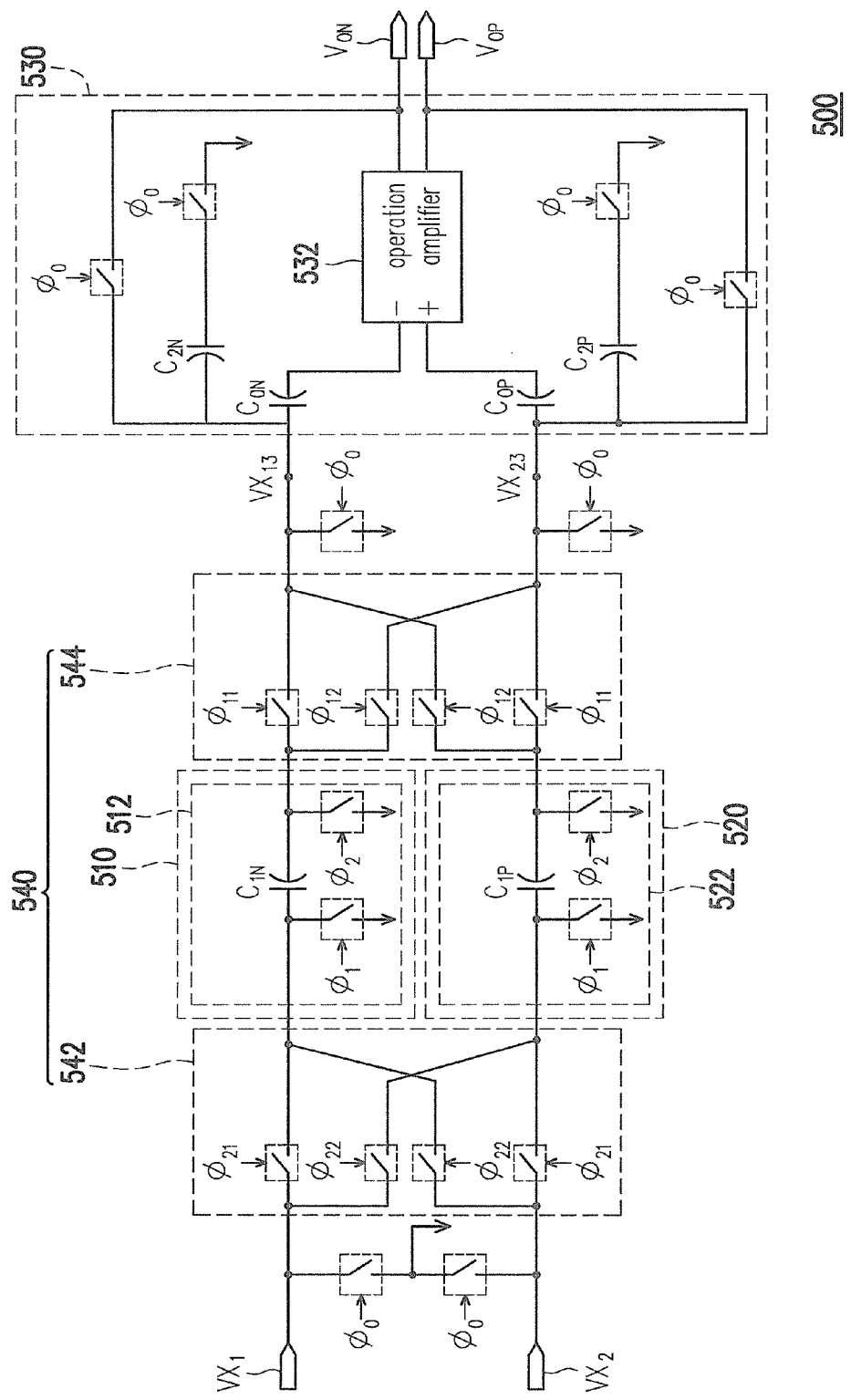
FIG. 7 is a schematic circuit diagram illustrating a capacitance sensing circuit according to another embodiment of the invention.
Figure 8:
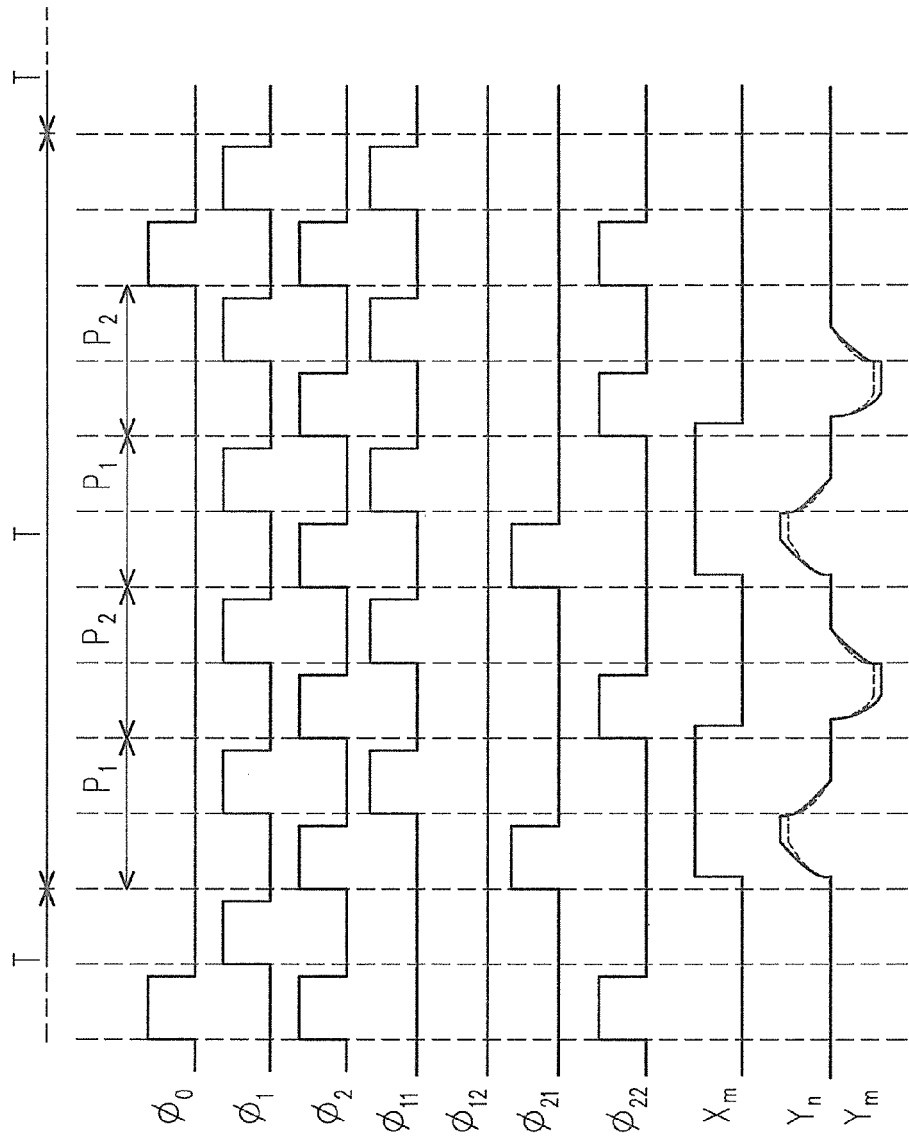
FIG. 8 is a timing diagram of control signals of the capacitance sensing circuit shown in FIG. 7.
Figure 9:
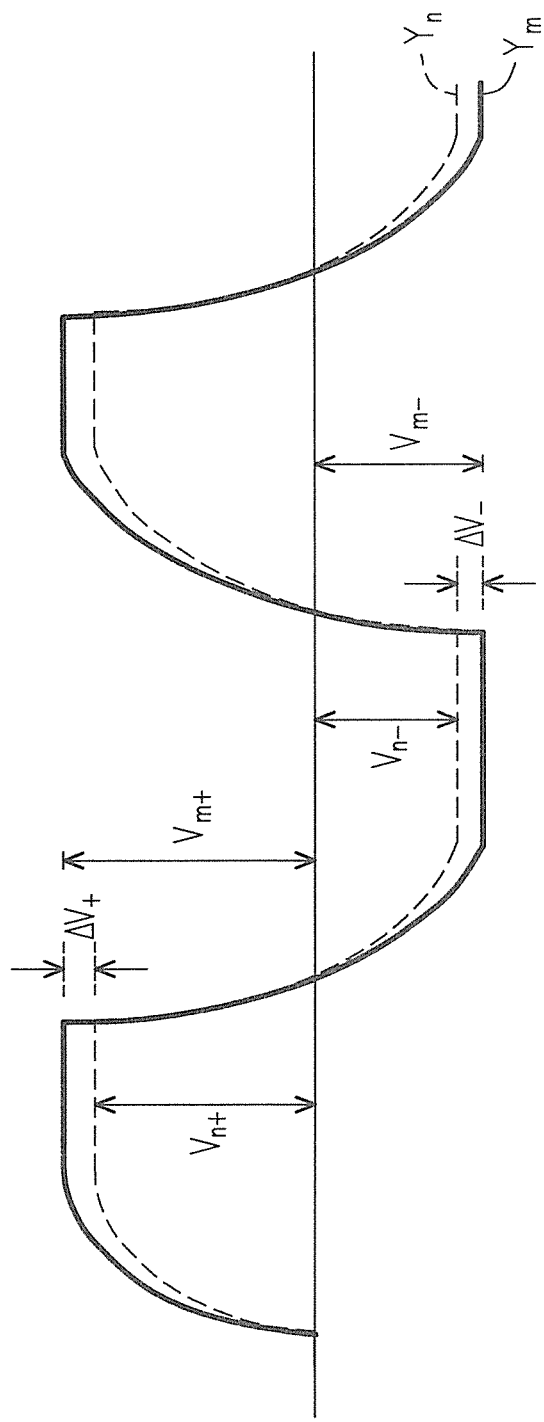
FIG. 9 shows schematic waveforms of the signal under test and the reference signal in FIG. 8.

FIG. 7 is a schematic circuit diagram illustrating a capacitance sensing circuit according to another embodiment of the invention. FIG. 8 is a timing diagram of control signals of the capacitance sensing circuit shown in FIG. 7. FIG. 9 shows schematic waveforms of the signal under test $Y_n$ and the reference signal $Y_m$ in FIG. 8.

Referring to FIG. 7 to FIG. 9, in the present embodiment, the capacitance sensing circuit 500 includes a first sensing channel 510, a second sensing channel 520, a difference comparing unit 530, and a swap unit 540. Herein, the first sensing channel 510 and the second sensing channel 520 respectively sense the waveform under test or the reference waveform. Herein, the waveform under test and the reference waveform, for example, are respectively the waveforms of the signal under test $Y_n$ and the reference signal $Y_m$ shown in FIG. 9.

It should be noted that, in the present embodiment, in the first period $P_1$ of the sensing period T, the driving signal $X_m$ applied to the driving line is at the high level. In this time, the first sensing channel 510 senses the waveform under test $Y_n$ and transmits the waveform under test $Y_n$ to the first input end $VX_{13}$ of the difference comparing unit 530, and the second sensing channel 520 senses the reference waveform $Y_m$ and transmits the reference waveform $Y_m$ to the second input end $VX_{23}$ of the difference comparing unit 530. Accordingly, in the first period $P_1$, the difference comparing unit 530 calculates the positive edge difference $\Delta V_+$ according to the waveform under test $Y_n$ and the reference waveform $Y_m$, and the positive edge difference $\Delta V_+$ is the difference between the voltage under test $V_{n+}$ and the reference voltage $V_{m+}$. That is, in the first period $P_1$, the difference comparing unit 530 stores the positive edge difference $\Delta V_+$ in the internal capacitor thereof.

On the other hand, in the first period $P_1$, by applying the driving signal $X_m$ at the high level to the driving line, the difference comparing unit 530 can sense the positive edge difference $\Delta V_+$ of the signal under test and the reference signal.

Besides, in the second period $P_2$ of the sensing period T, the first sensing channel 510 senses the reference waveform $Y_m$ and transmits the reference waveform $Y_m$ to the first input end $VX_{13}$ of the difference comparing unit 530, and the second sensing channel 520 senses the waveform under test $Y_n$ and transmits the waveform under test $Y_n$ to the second input end $VX_{23}$ of the difference comparing unit 530. Accordingly, in the second period $P_2$, the difference comparing unit 530 calculates the negative edge difference $\Delta V_-$ according to the waveform under test $Y_n$ and the reference waveform $Y_m$, and the negative edge difference $\Delta V_-$ is the difference between the voltage under test $V_{n-}$ and the reference voltage $V_{m-}$. That is, in the second period $P_2$, the difference comparing unit 530 stores the negative edge difference $\Delta V_-$ in the internal capacitor thereof.

It should be noted that, in the present embodiment, in the second period $P_2$, when the sensing channels 510 and 520 sensing the waveforms $Y_n$ and $Y_m$, the driving signal $X_m$ is at the low level. That is, applying the driving signal $X_m$ at the high level to the driving line is unnecessary, and the difference comparing unit 530 can simply sense the negative edge difference $\Delta V_-$ of the signal under test and the reference signal.

On the other hand, in the first period $P_1$ of the sensing period T, the driving signal $X_m$ is at the high level, the first input end $VX_{13}$ of the difference comparing unit 530 receives the waveform under test $Y_n$, and the second input end $VX_{23}$ thereof receives the reference waveform $Y_m$ to sense the positive edge difference $\Delta V_+$. On the contrary, in the second period $P_2$ of the sensing period T, the driving signal $X_m$ is at the low level, the first input end $VX_{13}$ thereof receives the reference waveform $Y_m$, and the second input end $VX_{23}$ thereof receives the waveform under test $Y_n$ to sense the negative edge difference $\Delta V_-$.

Accordingly, in the present embodiment, in the sensing period, the capacitance sensing circuit 500 senses the waveform under test and the reference waveform, i.e. the positive edge difference and the negative edge difference between the waveform under test and the reference waveform, by using dual edge couple, and outputs the differential signal according to the positive edge difference and the negative edge difference between the waveform under test and the reference waveform, so as to reduce driving pulses of the capacitance sensing circuit, thereby achieving the purpose of power-saving.

Furthermore, the swap unit 540 switches the first sensing channel 510 to sense the waveform under test or the reference waveform and switches the second sensing channel 520 to sense the waveform under test or the reference waveform. The swap unit 540 includes a first switch unit 542 and a second switch unit 544. In the first period $P_1$, the first switch unit 542 switches the first sensing channel 510 to receive the waveform under test and switches the second sensing channel 520 to receive the reference waveform. In the second period $P_2$, the first switch unit 542 switches the first sensing channel 510 to receive the reference waveform and switches the second sensing channel 520 to receive the waveform under test.

It should be noted that, in the present embodiment, in the first periods $P_1$ and the second periods $P_2$, the second switch unit 544 transmits an output of the first sensing channel 510 to the first input end $VX_{13}$ and transmits an output of the second sensing channel 520 to the second input end $VX_{23}$, such that the capacitance sensing circuit 500 senses the waveform under test and the reference waveform by using dual edge couple.

Specifically, the first sensing channel 510, for example, includes the charge-to-voltage converting unit 512. In each of the first periods $P_1$ of the sensing period T, the driving signal $X_m$ is at the high level, and the first sensing channel 510 receives the waveform under test $Y_n$ through the pad $VX_1$. Accordingly, in the first period $P_1$, when the timing signal $\psi_2$ is at the high level, the timing signal $\psi_{21}$ is also at the high level, such that the charge corresponding to the capacitor under test is stored in the storage capacitor $C_{1N}$. Next, when the timing signal $\psi_1$ is at the high level, the timing signal $\psi_{11}$ is also at the high level, such that the charge stored in the storage capacitor $C_{1N}$ is transmitted to the difference comparing unit 530 through the first input end $VX_{13}$ and stored in the integration capacitor $C_{2N}$.

Besides, the second sensing channel 520, for example, includes the charge-to-voltage converting unit 522. In each of the first periods $P_1$ of the sensing period T, the driving signal $X_m$ is at the high level, and the second sensing channel 520 receives the reference waveform $Y_m$ through the pad $VX_2$. Accordingly, in the first period $P_1$, when the timing signals $\psi_2$ and $\psi_{21}$ are at the high level, the charge corresponding to the reference capacitor is stored in the storage capacitor $C_{1P}$.

Next, when the timing signals $\psi_1$ and $\psi_{11}$ is at the high level, the charge stored in the storage capacitor $C_{1P}$ is transmitted to the difference comparing unit 530 through the second input end $VX_{23}$ and stored in the integration capacitor $C_{2P}$.

Accordingly, through the operation amplifier 532 and the integration capacitors $C_{2N}$ and $C_{2P}$, the difference comparing unit 530 can integrate and amplify the positive edge difference $\Delta V_+$ between the signal under test and the reference signal, and store the positive edge difference $\Delta V_+$ in the internal capacitor, and the gains are $C_{1N}/C_{2N}$ and $C_{1P}/C_{2P}$, respectively. Herein, it can be supposed with $C_{1N}=C_{1P}$ and $C_{2N}=C_{2P}$, but the invention is not limited thereto.

Next, in the second period $P_2$, when the timing signal $\psi_2$ is at the high level, the timing signal $\psi_{22}$ is also at the high level, it should be noted that, in this time, the charge corresponding to the capacitor under test is stored in the storage capacitor $C_{1P}$ of the second sensing channel 520. Thereafter, when the timing signal $\psi_1$ is at the high level, the timing signal $\psi_{11}$ is also at the high level, such that the charge stored in the storage capacitor $C_{1P}$ is transmitted to the difference comparing unit 530 through the second input end $VX_{23}$ and stored in the integration capacitor $C_{2P}$.

Besides, for the reference waveform, in the second period $P_2$, when the timing signals $\psi_2$ and $\psi_{22}$ are at the high level, the charge corresponding to the reference capacitor is stored in the storage capacitor $C_{1N}$ of the first sensing channel 510. Next, when the timing signals $\psi_1$ and $\psi_{11}$ is at the high level, the charge stored in the storage capacitor $C_{1N}$ is transmitted to the difference comparing unit 530 through the first input end $VX_{13}$ and stored in the integration capacitor $C_{2N}$.

That is, in the present embodiment, in the first period $P_1$, the first switch unit 542 switches the first sensing channel 510 to receive the waveform under test and switches the second sensing channel 520 to receive the reference waveform. On the contrary, in the second period $P_2$, the first switch unit 542 switches the first sensing channel 510 to receive the reference waveform and switches the second sensing channel 520 to receive the waveform under test.

It should be noted that, in the present embodiment, in the first period $P_1$, the second switch unit 544 transmits the charge of the capacitor under test to the first input end $VX_{13}$ of the difference comparing unit 530, and transmits the charge of the reference capacitor to the second input end $VX_{23}$, such that the difference comparing unit 530 calculates the positive edge difference $\Delta V_+$. On the contrary, in the second period $P_2$, the second switch unit 544 transmits the charge of the reference capacitor to the first input end $VX_{13}$, and transmits the charge of the capacitor under test to the second input end $VX_{23}$, such that the difference comparing unit 530 calculates the negative edge difference $\Delta V_-$. Accordingly, through the operation amplifier 532 and the integration capacitors $C_{2N}$ and $C_{2P}$, in each of the periods of the sensing period T, the difference comparing unit 530 can integrate and amplify the positive edge difference $\Delta V_+$ and the negative edge difference $\Delta V_-$.

Therefore, when the timing signal $\psi_0$ is at the high level, the positive edge difference $\Delta V_+$ and the negative edge difference $\Delta V_-$ which have been integrated and amplified during each of the periods can be stored in capacitors $C_{ON}$ and $C_{OP}$, and the corresponding differential signal $Y_D$ is outputted through the pads $V_{ON}$ and $V_{OP}$. Hence, the difference comparing unit 530 outputs the differential signal $Y_D$ according to at least one positive edge difference and at least one negative edge difference between the waveform under test and the reference waveform.

In the present embodiment, because the sensing period T includes a plurality of periods $P_1$ and $P_2$ which are alternately arranged, in the sensing period T, the capacitance sensing circuit 500 alternately senses the positive edge difference $\Delta V_+$ and the negative edge difference $\Delta V_-$ as the time goes by, so as to reduce driving pulses of the capacitance sensing circuit, thereby achieving the purpose of power-saving.

In the present embodiment, the sensing period T includes the plurality of periods $P_1$ and $P_2$ which are alternately arranged, but the invention is not limited thereto. In another embodiment, the sensing period T, for example, simply includes one first period $P_1$ and one second period $P_2$.

In the present embodiment, no matter in the first period $P_1$ or in the second period $P_2$, the second switch unit 544 transmits the output of the first sensing channel 510 to the first input end $VX_{13}$ of the difference comparing unit 530 and transmits the output of the second sensing channel 520 to the second input end $VX_{23}$ of the difference comparing unit 530. Accordingly, the swap unit 540 of the present embodiment may simply include the first switch unit 542.

Figure 10:
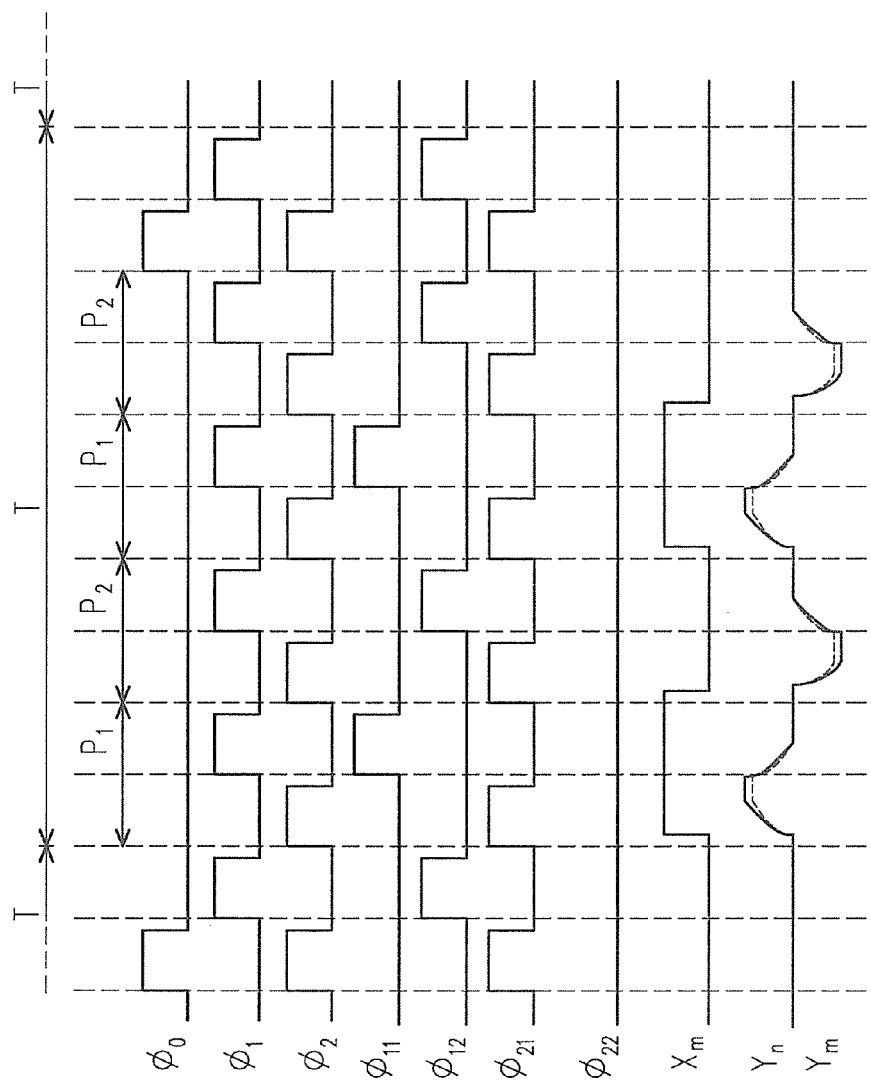
FIG. 10 is another timing diagram of control signals of the capacitance sensing circuit shown in FIG. 7.

FIG. 10 is another timing diagram of control signals of the capacitance sensing circuit shown in FIG. 7. Referring to FIG. 7 and FIG. 10, in the present embodiment, in the first period $P_1$ and the second period $P_2$, when the timing signal $\psi_2$ is both at the high level, the timing signal $\psi_{21}$ is also at the high level. Accordingly, in the sensing time T, the first sensing channel 510 all senses the waveform under test, and the second sensing channel 520 all senses the reference waveform.

It should be noted that, in the present embodiment, in the first period $P_1$, when the timing signal $\psi_1$ is at the high level, the timing signal $\psi_{11}$, is at the high level, and in the second period $P_2$, when the timing signal $\psi_{11}$ is at the high level, the timing signal $\psi_{21}$ is at the high level. Accordingly, in the first period $P_1$, the second switch unit 544 transmits the charge of the capacitor under test to the first input end $VX_{13}$ of the difference comparing unit 530, and transmits the charge of the reference capacitor to the second input end $VX_{23}$, such that the capacitance sensing circuit 500 calculates the positive edge difference $\Delta V_+$. On the contrary, in the second period $P_2$, the second switch unit 544 transmits the charge of the reference capacitor to the first input end $VX_{13}$, and transmits the charge of the capacitor under test to the second input end $VX_{23}$, such that the difference comparing unit 530 calculates the negative edge difference $\Delta V$ Accordingly, in the present embodiment, in the sensing period T, the capacitance sensing circuit 500 alternately senses the positive edge difference $\Delta V_+$ and the negative edge difference $\Delta V_-$ as the time goes by, so as to reduce driving pulses of the capacitance sensing circuit, thereby achieving the purpose of power-saving.

Besides, in the sensing time T, the first sensing channel 510 all senses the waveform under test, and the second sensing channel 520 all senses the reference waveform. Accordingly, the swap unit 540 of the present embodiment may simply include the second switch unit 544.

Figure 11:
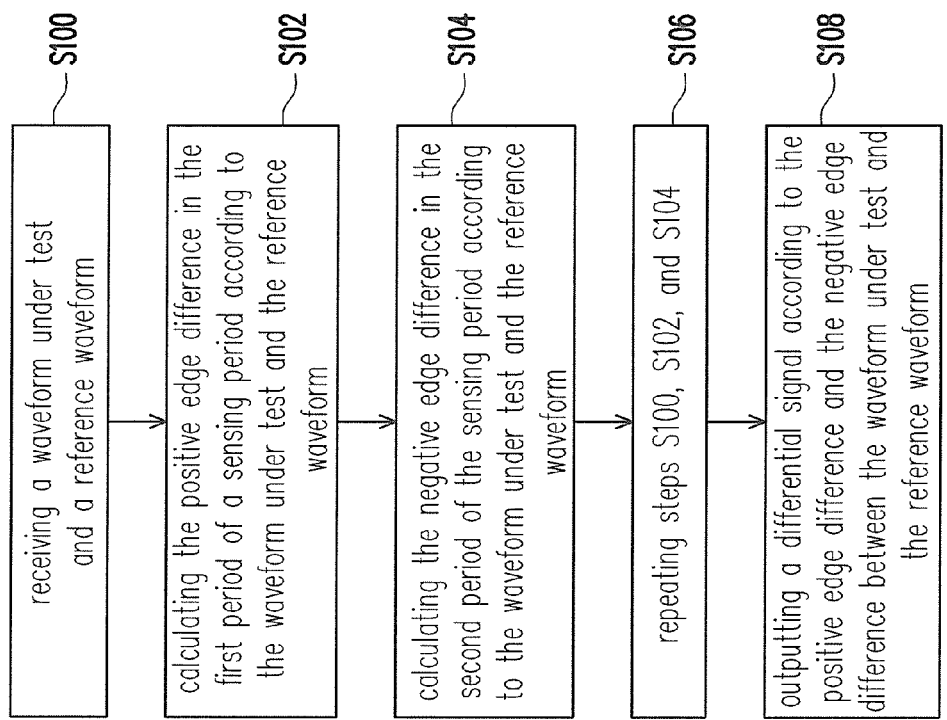
FIG. 11 is a flowchart of a capacitance sensing method according to an embodiment of the invention.

FIG. 11 is a flowchart of a capacitance sensing method according to an embodiment of the invention. Referring to FIG. 7, FIG. 8, and FIG. 11, the capacitance sensing method of the present embodiment includes following steps. First of all, in step S100, A waveform under test and a reference waveform are received. Next, in step S102, In the first period $P_1$, the positive edge difference is calculated according to the waveform under test and the reference waveform. Next, in step S104, In the second period $P_2$, the negative edge difference is calculated according to the waveform under test and the reference waveform. Thereafter, in step S106, repeat steps S100, S102, and S104 in the sensing period T. Accordingly, in step S108, a differential signal is outputted according to the positive edge difference and the negative edge difference between the waveform under test and the reference waveform.

Besides, the capacitance sensing method described in this embodiment of the invention is sufficiently taught, suggested, and embodied in the embodiments illustrated in FIG. 7 to FIG. 10, and therefore no further description is provided herein.

In summary, in the embodiments of the invention, by using the reference signal as a reference value for measuring the signal under test, the capacitance sensing circuit can cancel the external noise and further enhance the SNR thereof. Furthermore, in the sensing period, the capacitance sensing circuit senses the waveform under test and the reference waveform and outputs the differential signal according to the positive edge difference and the negative edge difference between the waveform under test and the reference waveform, so as to reduce the number of driving pulses of the capacitance sensing circuit and further achieve the purpose of power-saving.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A capacitance sensing circuit, driven at least by a driving signal having rising edges and falling edges, comprising:
    a difference comparing unit receiving a waveform under test and a reference waveform, wherein the difference comparing unit outputs a differential signal according to at least one positive edge difference and at least one negative edge difference between the waveform under test and the reference waveform,
    wherein the difference comparing unit has a first input end and a second input end, in at least one first period of a sensing period, the first input end receives the waveform under test, and the second input end receives the reference waveform, and in at least one second period of the sensing period, the first input end receives the reference waveform, and the second input end receives the waveform under test, and
    wherein the waveform under test and the reference waveform are positive pulses and negative pulses alternating changing respectively according to the rising edges and falling edges of the driving signal, so the at least one positive edge difference occurs at the rising edges and the at least one negative edge difference occurs at the falling edges.

2. The capacitance sensing circuit as claimed in claim 1, further comprising:
    a first sensing channel sensing the waveform under test or the reference waveform; and
    a second sensing channel sensing the waveform under test or the reference waveform,
    wherein in the first period of the sensing period, the first sensing channel senses the waveform under test and transmits the waveform under test to the first input end of the difference comparing unit, and the second sensing channel senses the reference waveform and transmits the reference waveform to the second input end of the difference comparing unit, and
    in the second period of the sensing period, the first sensing channel senses the reference waveform and transmits the reference waveform to the first input end of the difference comparing unit, and the second sensing channel senses the waveform under test and transmits the waveform under test to the second input end of the difference comparing unit.

3. The capacitance sensing circuit as claimed in claim 2, further comprising:
    a swap unit switching the first sensing channel to sense the waveform under test or the reference waveform and switching the second sensing channel to sense the waveform under test or the reference waveform.

4. The capacitance sensing circuit as claimed in claim 3, wherein the swap unit comprises:
    a first switch unit, in the first period, the first switch unit switching the first sensing channel to receive the waveform under test and switching the second sensing channel to receive the reference waveform, and in the second period, the first switch unit switching the first sensing channel to receive the reference waveform and switching the second sensing channel to receive the waveform under test.

5. The capacitance sensing circuit as claimed in claim 4, wherein the swap unit further comprises:
    a second switch unit, in the sensing period, the second switch unit transmitting an output of the first sensing channel to the first input end and transmitting an output of the second sensing channel to the second input end.

6. The capacitance sensing circuit as claimed in claim 1, further comprising:
    a first sensing channel sensing the waveform under test or the reference waveform; and
    a second sensing channel sensing the waveform under test or the reference waveform,
    wherein in the first period of the sensing period, the first sensing channel senses the waveform under test and transmits the waveform under test to the first input end of the difference comparing unit, and the second sensing channel senses the reference waveform and transmits the reference waveform to the second input end of the difference comparing unit, and
    in the second period of the sensing period, the first sensing channel senses the waveform under test and transmits the waveform under test to the second input end of the difference comparing unit, and the second sensing channel senses the reference waveform and transmits the reference waveform to the first input end of the difference comparing unit.

7. The capacitance sensing circuit as claimed in claim 6, further comprising:
    a swap unit switching the first sensing channel to transmit the waveform under test to the first input end or the second input end, and switching the second sensing channel to transmit the reference waveform to the first input end or the second input end.

8. The capacitance sensing circuit as claimed in claim 7, wherein the swap unit comprises:
    a first switch unit, in the first period, the first switch unit switching the first sensing channel to transmit the waveform under test to the first input end and switching the second sensing channel to transmit the reference waveform to the second input end, and in the second period, the first switch unit switching the first sensing channel to transmit the waveform under test to the second input end and switching the second sensing channel to transmit the reference waveform to the first input end.

9. The capacitance sensing circuit as claimed in claim 8, wherein the swap unit further comprises:

a second switch unit, in the sensing period, the second switch unit switching the first sensing channel to receive the waveform under test and switching the second sensing channel to receive the reference waveform.

10. The capacitance sensing circuit as claimed in claim 1, wherein the first periods and the second periods of the sensing period are alternately arranged.

11. The capacitance sensing circuit as claimed in claim 10, wherein an output of the first sensing channel and an output of the second sensing channel form the positive edge differences in each of the first periods and form the negative edge differences in each of the second periods, and the difference comparing unit amplifies and integrates the positive edge differences and the negative edge differences to output the differential signal.

12. The capacitance sensing circuit as claimed in claim 1, wherein the difference comparing unit comprises a differential amplifier, a comparator, or an integrator.

13. A touch sensing system, comprising:
   a touch input interface comprising a plurality of sensing capacitors outputting at least one waveform under test and at least one reference waveform; and
   a capacitance sensing circuit, driven at least by a driving signal having rising edges and falling edges, comprising:
   a difference comparing unit receiving the waveform under test and the reference waveform, wherein the difference comparing unit outputs a differential signal according to that at least one positive edge difference and at least one negative edge difference between the waveform under test and the reference waveform,
   wherein the difference comparing unit has a first input end and a second input end, in at least one first period of a sensing period, the first input end receives the waveform under test and the second input end receives the reference waveform, and in at least one second period of the sensing period, the first input end receives the reference waveform, and the second input end receives the waveform under test, and
   wherein the waveform under test and the reference waveform are positive pulses and negative pulses alternating changing respectively according to the rising edges and falling edges of the driving signal, so the alt least one positive edge difference occurs at the rising edges and the at least one negative edge difference occurs at the falling edges.

14. The touch sensing system as claimed in claim 13, further comprising:
   a first sensing channel sensing the waveform under test or the reference waveform; and
   a second sensing channel sensing the waveform under test or the reference waveform,
   wherein in the first period of the sensing period, the first sensing channel senses the waveform under test and transmits the waveform under test to the first input end of the difference comparing unit, and the second sensing channel senses the reference waveform and transmits the reference waveform to the second input end of the difference comparing unit, and
   in the second period of the sensing period, the first sensing channel senses the reference waveform and transmits the reference waveform to the first input end of the difference comparing unit, and the second sensing channel senses the waveform under test and transmits the waveform under test to the second input end of the difference comparing unit.

15. The touch sensing system as claimed in claim 14, further comprising:
   a swap unit switching the first sensing channel to sense the waveform under test or the reference waveform and switching the second sensing channel to sense the waveform under test or the reference waveform.

16. The touch sensing system as claimed in claim 15, wherein the swap unit comprises:
   a first switch unit, in the first period, the first switch unit switching the first sensing channel to receive the waveform under test and switching the second sensing channel to receive the reference waveform, and in the second period, the first switch unit switching the first sensing channel to receive the reference waveform and switching the second sensing channel to receive the waveform under test.

17. The touch sensing system as claimed in claim 16, wherein the swap unit further comprises:
   a second switch unit, in the sensing period, the second switch unit transmitting an output of the first sensing channel to the first input end and transmitting an output of the second sensing channel to the second input end.

18. The touch sensing system as claimed in claim 13, further comprising:
   a first sensing channel sensing the waveform under test or the reference waveform; and
   a second sensing channel sensing the waveform under test or the reference waveform,
   wherein in the first period of the sensing period, the first sensing channel senses the waveform under test and transmits the waveform under test to the first input end of the difference comparing unit, and the second sensing channel senses the reference waveform and transmits the reference waveform to the second input end of the difference comparing unit, and
   in the second period of the sensing period, the first sensing channel senses the waveform under test and transmits the waveform under test to the second input end of the difference comparing unit, and the second sensing channel senses the reference waveform and transmits the reference waveform to the first input end of the difference comparing unit.

19. The touch sensing system as claimed in claim 18, further comprising:
   a swap unit switching the first sensing channel to transmit the waveform under test to the first input end or the second input end, and switching the second sensing channel to transmit the reference waveform to the first input end or the second input end.

20. The touch sensing system as claimed in claim 19, wherein the swap unit comprises:
   a first switch unit, in the first period, the first switch unit switching the first sensing channel to transmit the waveform under test to the first input end and switching the second sensing channel to transmit the reference waveform to the second input end, and in the second period, the first switch unit switching the first sensing channel to transmit the waveform under test to the second input end and switching the second sensing channel to transmit the reference waveform to the first input end.

21. The touch sensing system as claimed in claim 20, wherein the swap unit further comprises:
   a second switch unit, in the sensing period, the second switch unit switching the first sensing channel to receive the waveform under test and switching the second sensing channel to receive the reference waveform.

22. The touch sensing system as claimed in claim 13, wherein the first periods and the second periods of the sensing period are alternately arranged.

23. The touch sensing system as claimed in claim 22, wherein an output of the first sensing channel and an output of the second sensing channel form the positive edge differences in each of the first periods and form the negative edge differences in each of the second periods, and the difference comparing unit amplifies and integrates the positive edge differences and the negative edge differences to output the differential signal.

24. The touch sensing system as claimed in claim 13, wherein the difference comparing unit comprises a differential amplifier, a comparator, or an integrator.

25. A touch display comprises the touch sensing system as claimed in claim 13.

26. A portable electronic apparatus comprises the touch sensing system as claimed in claim 13.

27. A capacitance sensing method, comprising:
Receiving a driving signal, having rising edges and falling edges,
Receiving a waveform under test and a reference waveform; and
Outputting a differential signal according to at least one positive edge difference and at least one negative edge difference between the waveform under test and the reference waveform,
Wherein receiving the waveform under test and the reference waveform by a first input end and a second input end, and in at least one first period of a sensing period, the first input end receives the waveform under test, and the second input end receives the reference waveform, and in at least one second period of the sensing period, the first input end receives the reference waveform, and the second input end receives the waveform under test, and
Wherein the waveform under test and the reference waveform are positive pulses and negative pulses alternating changing respectively according to the rising edges and falling edges of the driving signal, so the at least one positive edge difference occurs at the rising edges and the at least one negative edge difference occurs at the falling edges.

28. The capacitance sensing method as claimed in claim 27, further comprising:
calculating the positive edge difference in at least one first period of a sensing period according to the waveform under test and the reference waveform; and
calculating the negative edge difference in at least one second period of the sensing period according to the waveform under test and the reference waveform.

29. The capacitance sensing method as claimed in claim 28, wherein the first periods and the second periods of the sensing period are alternately arranged.

30. The capacitance sensing method as claimed in claim 29, wherein the step of outputting the differential signal comprises:
sensing the positive edge difference in each of the first periods;
sensing the negative edge difference in each of the second periods; and
amplifying and integrating the positive edge differences and the negative edge differences to output the differential signal.

* * * * *